United States Patent [19]

Andersen et al.

[11] Patent Number: 5,585,080
[45] Date of Patent: Dec. 17, 1996

[54] METHOD FOR RECOVERING IRON CHLORIDE, ALUMINUM CHLORIDE AND CALCIUM CHLORIDE FROM A LEACH SOLUTION

[75] Inventors: Einar Andersen; Bruno Ceccaroli, both of Kristiansand; Roald Gundersen, Vennesla, all of Norway

[73] Assignee: Elkem a/s, Norway

[21] Appl. No.: 396,498

[22] Filed: Mar. 2, 1995

[30] Foreign Application Priority Data

Mar. 30, 1994 [NO] Norway ................................ 941175

[51] Int. Cl.$^6$ ............................ C01F 7/00; C01F 11/00; C01G 49/00
[52] U.S. Cl. ........................ 423/126; 423/139; 423/157
[58] Field of Search ............................ 423/139, 157, 423/126

[56] References Cited

U.S. PATENT DOCUMENTS

| | | | |
|---|---|---|---|
| 3,809,548 | 5/1974 | Aas et al. | 423/348 |
| 3,832,165 | 8/1974 | Kane et al. | 75/420 |
| 4,054,638 | 10/1977 | Dreulle et al. | 423/139 |
| 4,237,102 | 12/1980 | Cohen et al. | 423/126 |
| 4,261,959 | 4/1981 | Kim et al. | 423/139 |
| 4,332,684 | 6/1982 | DeSchepper et al. | 423/139 |
| 4,490,338 | 12/1984 | DeSchepper et al. | 423/54 |
| 4,582,691 | 4/1986 | Fujimoto et al. | 423/139 |
| 5,228,903 | 7/1993 | O'Keefe | 75/743 |

OTHER PUBLICATIONS

Lo, T. C., et al, Handbook of Solvent Extraction, 1983, no month, pp. 676–677.

*Primary Examiner*—Steven Bos
*Attorney, Agent, or Firm*—Lucas & Just

[57] ABSTRACT

The present invention relates to a method for recovering iron chloride, aluminum chloride and calcium chloride from silicon and ferrosilicon or from residues which contain silicon and/or ferrosilicon and metal chlorides and optionally copper and/or copper compounds, which materials are leached with HCl or HCl+$FeCl_3$/$FeCl_2$ solutions, whereafter the solid silicon or ferrosilicon residue is removed from the leach solution and where any copper is removed from the leach solution. $Fe^{2+}$ in the leach solution is oxidized to $Fe^{3+}$ whereafter the leach solution is subjected to a liquid-liquid extraction by means of an organic phase containing n-tributyl phosphate dissolved in a hydrocarbon solvent in order to extract $FeCl_3$ and at least a part of $CaCl_2$ from the leach solution, stripping $FeCl_3$ and any $CaCl_2$ from the organic phase by water, concentrating the remaining solution by evaporation and adding HCl gas to the solution in order to selectively precipitate $AlCl_3.6H_2O$ from the solution and recovering $AlCl_3.6H_2O$ from the solution by filtration.

16 Claims, No Drawings

METHOD FOR RECOVERING IRON CHLORIDE, ALUMINUM CHLORIDE AND CALCIUM CHLORIDE FROM A LEACH SOLUTION

The present invention relates to a method for recovering metal chlorides from silicon and ferrosilicon alloys which have been reacted with chlorinating agents.

By reaction of particulate ferrosilicon containing about 90–96% by weight of silicon with a leaching solution containing $FeCl_3$/HCl, pure granular silicon is produced and metallic impurities in the raw materials, mainly Fe, Al and Ca, are dissolved in the leach solution. This process for producing pure silicon is described in U.S. Pat. No. 3,809,548. The leach solution from this process which contains a high amount of dissolved metal chlorides, particularly Fe, Al and Ca chloride has up till now been disposed of. However, due to environmental reasons, it will no longer be acceptable to dispose of this kind of metal chloride containing leach liquors.

The same kind of metal chloride containing leach liquors can be produced from residues from other processes. Thus by reaction of ground or lumpy silicon or ferrosilicon with chlorine gas or gaseous HCl in reactors for production of chlorosilanes, preferably trichlorosilane or tetrachlorosilane, impurities contained in the silicon or the ferrosilicon raw material, mainly Fe, Al and Ca, are accumulated mainly as chlorides in silicon-containing residues in the reactors. These residues which mostly contain residual silicon or silicon alloys together with the above mentioned metal chlorides and carbon, have so far been disposed of. It will, however, for environmental reasons, no longer be acceptable to dispose of these residues in normal disposal sites. These residues can, however, be leached by $FeCl_3$/HCl solutions to produce a valuable silicon containing material and a leach solution containing metal chlorides. The silicon containing material can be used as a silicon source in different metallurgical processes.

Finally, a metal chloride containing residue is produced by reaction of silicon powder with alkylchloride, particularly methylchloride, for producing alkylchlorosilanes. In this process copper or a copper compound is used as a catalyst. Also in this process silicon based residues which contain metal chlorides originating from impurities in the materials are produced. The residue will in addition contain copper and copper compounds originating from the catalyst. It is known to recover copper values from this residue by subjecting the residue to a leaching process using mineral acids, particularly HCl, whereby copper and most of the metal chlorides are dissolved and where copper is recovered from the leach solution by for example cementation. The leach solution after copper has been removed does, however, contain a number of dissolved metal chlorides, such as Fe and Al.

It is an object of the present invention to provide a method for treating the above-mentioned metal chloride containing residues and leach solutions in order to recover iron chloride, aluminium chloride and at least a part of any calcium chloride present in the form of valuable products and to obtain a final solution having a very small volume compared to the starting solution.

Accordingly, the present invention relates to a process for recovering iron chloride, aluminium chloride and calcium chloride from silicon and ferrosilicon or from residues which contain silicon and/or ferrosilicon and metal chlorides and optionally copper and/or copper compounds, which materials are leached with HCl or HCl+$FeCl_3$/$FeCl_2$ solutions, whereafter the solid silicon or ferrosilicon residue is removed from the leach solution and where any copper is removed from the leach solution, which method is characterized in that $Fe^{2+}$ in the leach solution is oxidized to $Fe^{3+}$ whereafter the leach solution is subjected to liquid-liquid extraction by means of an organic phase containing n-tributyl phosphate dissolved in a hydrocarbon solvent in order to extract $FeCl_3$ and at least a part of $CaCl_2$ from the leach solution, stripping $FeCl_3$ and any $CaCl_2$ from the organic phase by water, concentrating the remaining solution by evaporation and adding HCl gas to the solution in order to selectively precipitate $AlCl_3 \cdot 6H_2O$ from the solution and recovering $AlCl_3 \cdot 6H_2O$ from the solution by filtration.

By the present invention Fe and at least a part of Ca are recovered in the form of a $FeCl_3$-solution having a high Fe-concentration. The obtained $FeCl_3$ solution generally has a $Fe^{3+}$ concentration of above 100 g/l. The $FeCl_3$ solution can be used for example in municipal sewage treatment plants as a flocculating agent. It has been found that better results have been obtained by using a $FeCl_3$ solution containing some $CaCl_2$ as a flocculating agent than using a pure $FeCl_3$ solution.

The $AlCl_3 \cdot 6H_2O$ is washed with water and preferably dissolved in water or in HCl in order to obtain $AlCl_3$ solutions which can be used in for example municipal sewage treatment plants as a flocculating agent.

The residual solution after removal of Fe and Al generally has a total iron content of less than 5 g/l and an aluminium content of less than 5 g/l. The volume of this residual solution is very small compared to the volume of the starting solution, and may if it is further concentrated by evaporation have a volume which is less than 10% of the volume of the starting solution. This residual solution can in most instances be deposited after having been neutralized.

The present invention will now be further described by way of examples.

EXAMPLE 1

A leach solution from a process for leaching of metallurgical grade, 93.5% ferrosilicon with a HCl+$FeCl_3$ solution had the following composition:

| | |
|---|---|
| $Fe^{3+}$ | <1 g/l |
| $Fe^{2+}$ | 85 g/l |
| $Al^{3+}$ | 45 g/l |
| $Ca^{2+}$ | 12 g/l |
| HCl | 35 g/l |

$Fe^{2+}$ in this solution was oxidized to $Fe^{3+}$ by adding HCl and using chlorine gas. The oxidized solution had the following composition:

| | |
|---|---|
| $Fe^{3+}$ | 85 g/l |
| $Fe^{2+}$ | <1 g/l |
| $Al^{3+}$ | 45 g/l |
| $Ca^{2+}$ | 12 g/l |
| HCl | 60 g/l |

The oxidized solution was mixed with an organic phase comprising 40% n-tributyl phosphate (TBP) dissolved in an aromatic hydrocarbon solvent in order to extract $Fe^{3+}$ and a part of $Ca^{2+}$ from the leach solution. The extraction was carried out in four mixer-settler stages operated with countercurrent flow. $Fe^{3+}$ was extracted to the organic phase and was thereafter stripped by contacting the organic phase with water in four mixer-settler stages with countercurrent flow.

An aqueous $Fe^{3+}$ solution containing 110 g/l $Fe^{3+}$ and 10 g/l $Ca^{2+}$ was obtained. The obtained $Fe^{3+}$ can be used in for example municipal sewage treatment plants as a flocculating agent.

The raffinate from the extraction step had the following composition:

| | |
|---|---|
| $Fe^{3+}$ | <2 g/l |
| $Fe^{2+}$ | <1 g/l |
| $Al^{3+}$ | 45 g/l |
| $Ca^{2+}$ | 4 g/l |
| HCl | 15 g/l |

This solution was subjected to evaporation and HCl gas was added in order to precipitate aluminium in the form of aluminium chloride hexahydrate which thereafter was filtered from the solution and washed with water. The aluminium chloride hexahydrate crystals had the following composition:

| | |
|---|---|
| Fe total | <0.01 grams pr. kg $AlCl_3.6H_2O$ |
| Al | 95 grams pr. kg $AlCl_3.6H_2O$ |

The aluminium chloride hexahydrate crystals can be dissolved in water and used for example in municipal sewage treatment plants as a flocculating agent.

The residual solution after precipitation of aluminium had the following composition:

| | |
|---|---|
| Fe total | <2 g/l |
| $Al^{3+}$ | <2 g/l |
| $Ca^{2+}$ | 4 g/l |
| HCl | 390 g/l |

This residual solution can either be disposed of after recovering HCl or it can be further purified.

EXAMPLE 2

Silicon containing residue from a process where 96% silicon has been reacted with HCl gas at elevated temperature, was leached with a solution containing hydrochloric acid, aluminium chloride and $FeCl_3/FeCl_2$. The composition of the acid after leaching had the following composition:

| | |
|---|---|
| $Fe^{3+}$ | <1 g/l |
| $Fe^{2+}$ | 80 g/l |
| $Al^{3+}$ | 45 g/l |
| HCl | 15 g/l |

Hydrochloric acid and chlorine gas were added to the solution to oxidize ferrous chloride to ferric chloride. The oxidized solution had the following composition:

| | |
|---|---|
| $Fe^{3+}$ | 80 g/l |
| $Fe^{2+}$ | <1 g/l |
| $Al^{3+}$ | 45 g/l |
| HCl | 60 g/l |

This solution was mixed with an organic phase comprising 40% n-tributylphosphate (TBP) in an aromatic hydrocarbon solvent in order to extract $Fe^{3+}$ from the solution. The extraction was carried out in four mixer-settler stages operated with countercurrent flow. $Fe^{3+}$ was extracted to the organic phase and was thereafter stripped by contacting the organic phase with water. An aqueous $Fe^{3+}$ solution containing 110 g/l $Fe^{3+}$ was obtained. The obtained $Fe^{3+}$ solution can be used in for example municipal sewage treatment plants as a flocculating agent.

The raffinate from the extraction step had the following solution:

| | |
|---|---|
| $Fe^{3+}$ | <2 g/l |
| $Fe^{2+}$ | <1 g/l |
| $Al^{3+}$ | 45 g/l |
| HCl | 15 g/l |

This solution was now subjected to evaporation and HCl gas was added in order to precipitate aluminium in the form of aluminium chloride hexahydrate which thereafter was filtered from the solution and washed with water.

The aluminium chloride hexahydrate crystals can be dissolved in water and used for example in municipal sewage treatment plants as a flocculating agent.

The residual solution after precipitation of aluminium had the following composition:

| | |
|---|---|
| Fe total | <2 g/l |
| $Al^{3+}$ | <2 g/l |
| HCl | 380 g/l |

This residual solution can either be disposed of or can be further purified.

EXAMPLE 3

Silicon containing residue from a process where metallurgical grade silicon metal has been reacted with methylchloride in the presence of a copper catalyst was leached with a solution containing hydrochloric acid, aluminium chloride and $FeCl_3/FeCl_2$. The composition of the acid after leaching had the following composition:

| | |
|---|---|
| $Fe^{3+}$ | <1 g/l |
| $Fe^{2+}$ | 65 g/l |
| $Cu^{2+}$ and $Cu^+$ | 15 g/l |
| $Al^{3+}$ | 45 g/l |
| HCl | 15 g/l |

The copper in the solution was removed from the solution by cementation on iron. After adding iron to the solution the cemented copper and any residual elemental iron was filtered from the solution. The filtrate had the following composition:

| | |
|---|---|
| $Fe^{3+}$ | <1 g/l |
| $Fe^{2+}$ | 80 g/l |
| $Cu^{2+}$ and $Cu^+$ | <0.1 g/l |
| $Al^{3+}$ | 45 g/l |
| HCl | 15 g/l |

Hydrochloric acid and chlorine gas were added to the solution to oxidize ferrous chloride to ferric chloride. The oxidized solution had the following composition:

| | |
|---|---|
| $Fe^{3+}$ | 80 g/l |
| $Fe^{2+}$ | <1 g/l |
| $Cu^{2+}$ | <0.1 g/l |
| $Al^{3+}$ | 45 g/l |
| HCl | 60 g/l |

This solution was mixed with an organic phase comprising 40% n-tributylphosphate (TBP) in an aromatic hydrocarbon solvent in order to extract $Fe^{3+}$ from the solution.

The extraction was carried out in four mixer-settler stages operated with countercurrent flow. $Fe^{3+}$ was extracted to the organic phase and was thereafter stripped by contacting the organic phase with water. An aqueous $Fe^{3+}$ solution containing 110 g/l $Fe^{3+}$ was obtained. The obtained $Fe^{3+}$ solution can be used in for example sewage treatment plants as a flocculating agent.

The raffinate from the extraction step had the following composition:

| | |
|---|---|
| $Fe^{3+}$ | <2 g/l |
| $Fe^{2+}$ | <1 g/l |
| $Cu^{2+}$ | <0.1 g/l |
| $Al^{3+}$ | 45 g/l |
| HCl | 15 g/l |

The solution was then subjected to evaporation and HCl gas was added in order to precipitate aluminium in the form of aluminum chloride hexahydrate which thereafter was filtered from the solution and washed with water.

The aluminum chloride hexahydrate crystals can be dissolved in water and used for example in municipal sewage treatment plants as a flocculating agent.

The residual solution after precipitation of aluminium had the following composition:

| | |
|---|---|
| Fe total | <2 g/l |
| $Cu^{2+}$ | <0.1 g/l |
| $Al^{3+}$ | <2 g/l |
| HCl | 380 g/l |

This residual solution can either be disposed of or can be further purified.

We claim:

1. A method for recovering iron chloride, aluminum chloride and calcium chloride from a leach solution which contains iron chloride ($FeCl_2$), aluminum chloride ($AlCl_3$), calcium chloride ($CaCl_2$), and hydrogen chloride (HCl), and reducing the volume of the leach solution, said method comprising the steps of:

(a) contacting the leach solution with an oxidizing agent to convert $FeCl_2$ in the leach solution to $FeCl_3$;

(b) subjecting the leach solution to liquid-liquid extraction by contacting said leach solution with an organic phase comprising n-tributylphosphate dissolved in a hydrocarbon solvent to extract $FeCl_3$ and at least a portion of $CaCl_2$ from the leach solution and recovering the organic phase containing $FeCl_3$ and $CaCl_2$;

(c) stripping $FeCl_3$ and $CaCl_2$ from the recovered organic phase with water and recovering the water which contains $FeCl_3$ and $CaCl_2$ therein;

(d) evaporating the leach solution remaining after the liquid-liquid extraction to form a concentrated leach solution containing $AlCl_3$;

(e) precipitating $AlCl_3.6H_2O$ from the concentrated leach solution by contacting said concentrated leach solution with HCl gas, and recovering the precipitated $AlCl_3.6H_2O$ from the concentrated leach solution; and (f) recovering a concentrated leach solution having a reduced volume compared to the volume of untreated leach solution.

2. The method of claim 1 wherein the recovered precipitated $AlCl_3.6H_2O$ is dissolved in water or HCl-solution to produce an $AlCl_3$ solution.

3. The method of claim 1 wherein the oxidizing agent in step (a) is hydrochloric acid and chlorine gas.

4. The method of claim 1 wherein the organic phase comprises 40% n-tributylphosphate in an aromatic hydrocarbon solvent.

5. The method of claim 1 wherein the $AlCl_3.6H_2O$ is recovered in step (e) by filtration.

6. The method of claim 1 wherein the $FeCl_3$ is present in the water in step (c) in an amount of at least about 100 g/l based on the iron content of the $FeCl_3$.

7. The method of claim 2 wherein said recovered, precipitated $AlCl_3.6H_2O$ is washed with water subsequent to dissolving said recovered, precipitated $AlCl_3.6H_2O$ in water or HCl-solution.

8. The method of claim 7 wherein the washed $AlCl_3.6H_2O$ is subsequently dissolved in water.

9. A method for recovering iron chloride, aluminum chloride and calcium chloride from a leach solution and reducing the volume of the leach solution wherein said leach solution is obtained from a process for making pure granular silicon, or a process for making silicon containing material from a residue of a process for making chlorosilanes, or a process for recovering copper from a residue of a process for making alkylchlorosilanes, said leach solution containing iron chloride ($FeCl_2$), aluminum chloride ($AlCl_3$), calcium chloride ($CaCl_2$), and hydrogen chloride (HCl), said method comprising the steps of:

(a) contacting the leach solution with an oxidizing agent to convert $FeCl_2$ in the leach solution to $FeCl_3$;

(b) subjecting the leach solution to liquid-liquid extraction by contacting said leach solution with an organic phase comprising n-tributylphosphate dissolved in a hydrocarbon solvent to extract $FeCl_3$ and at least a portion of $CaCl_2$ from the leach solution and recovering the organic phase containing $FeCl_3$ and $CaCl_2$;

(c) stripping $FeCl_3$ and $CaCl_2$ from the recovered organic phase with water and recovering the water which contains $FeCl_3$ and $CaCl_2$ therein;

(d) evaporating the leach solution remaining after the liquid-liquid extraction to form a concentrated leach solution containing $AlCl_3$;

(e) precipitating $AlCl_3.6H_2O$ from the concentrated leach solution by contacting said leach solution with HCl gas, and recovering the precipitated $AlCl_3.6H_2O$ from the concentrated leach solution; and (f) recovering a concentrated leach solution having a reduced volume compared to the volume of untreated leach solution.

10. The method of claim 9 wherein the recovered precipitated $AlCl_3.6H_2O$ is dissolved in water or HCl-solution to produce an $AlCl_3$ solution.

11. The method of claim 9 wherein the oxidizing agent in step (a) is hydrochloric acid and chlorine gas.

12. The method of claim 9 wherein the organic phase comprises 40% n-tributylphosphate in an aromatic hydrocarbon solvent.

13. The method of claim 9 wherein the $AlCl_3.6H_2O$ is recovered in step (e) by filtration.

14. The method of claim 9 wherein the $FeCl_3$ is present in the water in step (c) in an amount of at least about 100 g/l based on the iron content of the $FeCl_3$.

15. The method of claim 10 wherein said recovered, precipitated $AlCl_3.6H_2O$ is washed with water subsequent to dissolving said recovered, precipitated $AlCl_3.6H_2O$ in water or HCl-solution.

16. The method of claim 15 wherein the washed $AlCl_3.6H_2O$ is subsequently dissolved in water.

* * * * *